Dec. 19, 1961   L. G. DILL ET AL   3,014,199
SIREN ACTUATED WARNING DEVICE FOR AUTOMOBILES
Filed April 11, 1960   2 Sheets-Sheet 1

INVENTORS
Leslie G. Dill
Robert B. Molitor
BY
atty.

INVENTORS
Leslie G. Dill
Robert B. Molitor

United States Patent Office 3,014,199
Patented Dec. 19, 1961

3,014,199
SIREN ACTUATED WARNING DEVICE FOR AUTOMOBILES
Leslie G. Dill, N. 4418 Maringo, and Robert B. Molitor, E. 608 Dalton, both of Spokane, Wash.
Filed Apr. 11, 1960, Ser. No. 21,399
2 Claims. (Cl. 340—34)

This invention relates to a novel device to visibly warn motorists of the approach of an emergency vehicle using a siren.

In modern high-speed driving the approach of a fast-moving emergency vehicle using a siren is a constant source of danger to motorists unless they are fully aware of the approaching vehicle. Although a siren is high pitched and extremely loud, many motorists are not warned of the approach of an emergency vehicle until it is directly in front or behind them—or until a collision occurs. The siren's warning may be lost in the noise of traffic or due to obstructing buildings. More commonly it is missed due to faulty hearing or the winter practice of driving a car with all the windows closed. This practice has now been carried over to summer driving due to the advent of air conditioning in automobiles. The prevalent use of automobile radios also distracts the motorist's attention and may drown out a distant siren.

It is an object of this invention to provide a device which can be easily mounted on any vehicle and which will signal the driver of the vehicle when a siren is detected in the vicinity of the vehicle. The signal will preferably be visible, such as a light mounted conveniently on the dashboard, although it may be audible for drivers having no hearing defects.

It is another object of the invention to provide a simple electronic circuit to detect and respond only to sirens. It is a further object to provide a built-in test circuit so that the driver of the vehicle can momentarily check the device as mounted without disturbing the apparatus in any manner.

These and further objects will be evident from a study of the preferred embodiment of the invention disclosed in the drawings and fully explained in the following specification. This embodiment is for illustrative purposes only and is not intended to limit the scope of the invention as defined in the annexed claims.

Figure 1:
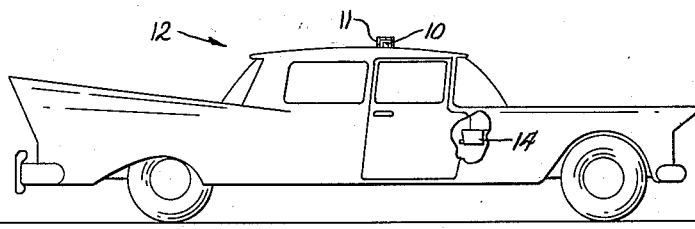
FIGURE 1 is a side view of an automobile equipped with the invention, portions of the automobile being broken away to show the control panel within the vehicle.
Figure 3:
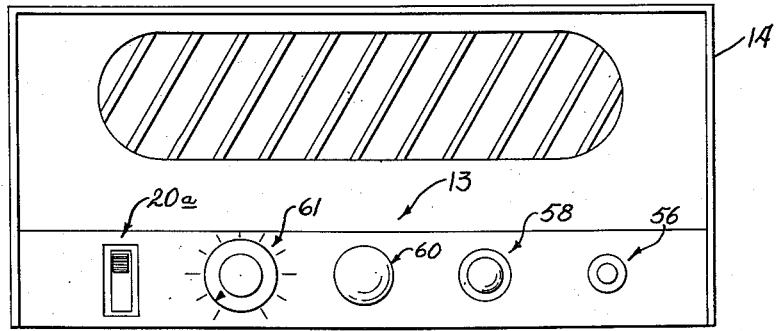
FIGURE 3 is a front view of the control panel.

As shown in FIGURE 1, sounds are received into the novel warning device by means of a microphone 10 mounted on the exterior of the vehicle 12 within a casing 11. Casing 11 is filled with plastic foam or other cushioning material capable of transmitting sound. The foam protects the microphone from damage due to road shocks or vibrations. The casing 11 serves as weather protection and also prevents the reception of wind whistle, which would interfere with the usefulness of the invention.

The remainder of the invention is mounted on or below the dash panel within the vehicle 12. The particular construction or design of this structure is unimportant and may be adapted to any automotive vehicle. The control panel 13 is the front wall of a housing 14.

Figure 2:
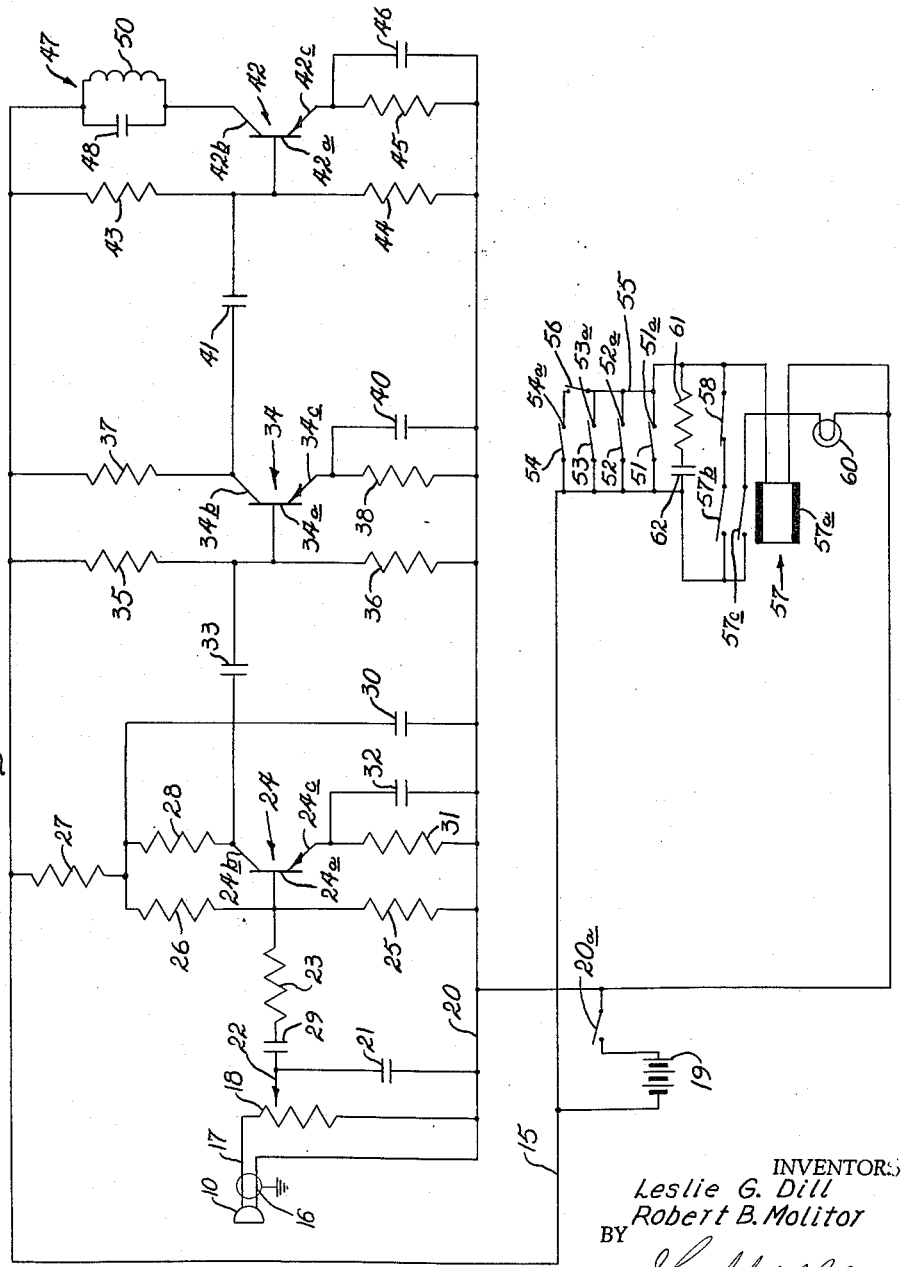
FIGURE 2 is a wiring diagram of the safety circuit.

Mounted within housing 14 is the circuit shown in FIGURE 2. This circuitry may be conveniently split into two portions, namely an amplifier shown at the top of the figure and a lamp control circuit shown at the bottom of the figure.

The amplifier consists of two voltage amplifying stages and a final power amplifying stage. The power supply used by the circuit is the vehicle battery, shown at 19. A line 15 connected to the negative terminal of the battery 19 serves as ground for the circuits. The microphone 10 is preferably a crystal microphone so as to minimize the reception of extraneous sounds. The shielded leads 16, 17 from microphone 10 are connected across a variable resistance 18 which acts as a sensitivity control for the amplifier. Lead 16 is also connected to line 20, which is wired to the positive terminal of battery 14 by means of switch 20a. A condenser 21 is wired between the output line 22 for variable resistance 18 and line 20. A coupling condenser 29 and a resistor 23 are wired in series between the output line 22 and the base 24a of transistor 24 in the first amplifier stage. The base 24a of transistor 24 is connected by means of resistor 25 to the line 20. It is biased to ground by means of resistor 26 which branches from a common load resistor 27. A second branch load resistor 28 is wired between resistor 27 and the collector 24b of transistor 24. A condenser 30 is wired between line 20 the junction of resistors 26—28. The emitter 24c of transistor 24 is connected through parallel resistor 31 and condenser 32 to line 20.

The collector output from transistor 24 is coupled by condenser 33 to the base 34a of the second stage transistor 34, which is wired to line 15 by means of a biasing resistor 35 and to line 20 by means of resistor 36. A load resistor 37 is wired between collector 34b and line 15 and parallel resistor 38 and condenser 40 serve to connect the emitter 34c and line 20.

The collector output from collector 34b is carried by coupling condenser 41 to the base 42a of transistor 42 in the power amplifying stage. Again the base 42a is biased to line 15 by means of resistor 43 and is connected to line 20 by means of resistor 44. The emitter 42c is wired to parallel resistor 45 and condenser 46 which are in turn connected to line 20. A tuned tank circuit 47 is wired between the collector 42b and line 15. Circuit 47 is the amplifier output.

Tuned tank circuit 47 comprises a parallel condenser 48 and a reed bank coil 50. Circuit 47 is designed to produce oscillations in coil 50 in response to the frequency of the sounds received by microphone 10.

Coil 50 controls the bank of four reeds 51—54, which are tuned as described later. The reeds 51—54 are connected to line 15. The respective contacts 51a—53a associated with reeds 51—53 are connected to a common line 55. The contact 54a associated with reed 54 is connected to a normally open switch 56 interposed between reed 54 and common line 55. The coil 57a of a normally open double pole, single throw relay 57 is wired between common line 55 and line 20. The first set of contacts 57b in relay 57 are wired in series with a normally closed reset switch 58 connected between common line 55 and line 15. Contacts 57b act to complete a holding circuit for relay 57. The second set of contacts 57c in relay 57 are wired in series with an indicator lamp 60 wired between line 15 and line 20. A resistor 61 and condenser 62 are wired in series across the reeds 51—54 to accommodate surges of current when the reed circuits are broken.

Figure 4:
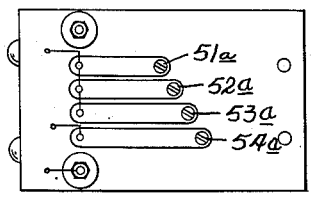
FIGURE 4 is a front view of the reed assembly.
Figure 5:
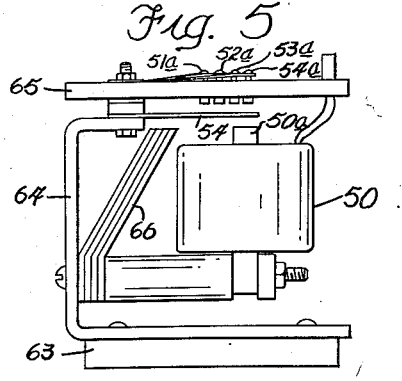
FIGURE 5 is a side view of the assembly shown in FIGURE 4.

The structure of the reed bank is shown in FIGURES 4 and 5. The base of the bank is a lead block 63 which protects it from extraneous vibrations and is adapted to be attached to the chassis of housing 14. A back bracket 64 supports an insulated top panel 65. The reeds 51—54 are mounted on the lower surface of panel 65 and make contact with adjustable contact screws 51a—54a. A permanent magnet 66 serves to normally hold reeds 51—54 apart from contact screws 51a—54a. The reed bank coil 50 is mounted with its core 50a below the reeds. It is evident that oscillations in coil 50 will set up a varying magnetic field in the vicinity of reeds 51—54. Should the frequency of these oscillations match the resonant frequency of one of the reeds 51—54 it will make electrical contact with its respective contact screw 51a—54a.

The reeds 51—53 are chosen to cover the normal range of sirens, which may range from 750 to 2,500 cycles per second. A workable arrangement has been found to be a series of three reeds having tuned frequencies of 900, 1,125 and 1,375 cycles per second respectively. The reed 54 is designed to respond to the frequency of an automobile horn and may be arbitrarily selected at a low value such as 400 cycles per second.

The control panel 13 contains all the external controls required by the driver. They consist of the main on-off switch 19, which controls the entire apparatus; lamp 60, which controls the detection of a siren; a sensitivity control 61, which varies the resistor 18; the reset switch 58; and the testing switch 56.

The operation of the device is as follows: The driver will turn switch 19 to its "on" position upon entering the car. If desired, this switch could be incorporated in the ignition switch so as to be turned on automatically any time the vehicle is in use. The microphone 10 will then pick up outside sounds, which will be amplified by the three stage amplifier. The degree of amplification can be selectively varied by adjustment of control 61. By making the circuit highly sensitive a range of several blocks can be easily obtained above the usual background traffic noises.

Sounds outside the frequency range of sirens (generally 1,000 to 2,000 c.p.s.) will not activate the device, since the three reeds 51—53 are tuned for specific siren ranges. When a siren is detected, its frequency will be amplified and reflected in oscillations produced at coil 50. These oscillations will then act upon one of the reeds 51—53 and cause it to vibrate due to its matched tuned frequency. The reed will make contact with its respective screws 51a—53a to complete the circuit to relay 57. Relay contacts 57b and 57c will then close. Contacts 57c will activate the indicator lamp 60, which will remain lighted due to closed contacts 57b. This will alert the driver and warn him of the approaching siren. Lamp 60 will be lighted until the driver opens reset switch 58 which opens the circuit to relay 57 and therefore releases contacts 57b and 57c. The apparatus is then in operating condition to detect the next siren.

In order to provide a simple mobile test of the apparatus at any time, the driver need only close the testing switch 56. This completes the circuitry for reed 54 which is tuned at a low frequency such as 400 c.p.s. By using the vehicle horn, which normally has some frequency near 400 c.p.s., the sound of the horn will be received by microphone 10 and amplified. Coil 50 will then close reed 54 against screw 54a to operate relay 57 in the same manner as described above to thereby light lamp 60. Reset switch 58 is again used to open the relay 57 for normal use when switch 56 is open. This produces a simple, visible test of all the components as mounted and during actual operation of the vehicle.

Various modifications will be evident from a study of the example given herein. Insofar as they fall within the scope of the invention as defined in the following claims, it is intended that such modification be covered by this disclosure.

Having thus described our invention, we claim:

1. In a siren actuated warning device, the combination with an amplifier, sound receiving means wired to the input of the amplifier, said amplifier having an oscillating coil output; of reed means having a resonant frequency tuned to the frequency of a siren, said reed means being positioned adjacent said oscillating coil output so as to be movable thereby, indicator means, relay means wired between the indicator means and said reed means, said relay means being adapted to activate said indicator means in response to movement of said reed means, additional reed means having a resonant frequency tuned to the frequency of an audible test signal, said additional reed means being wired in parallel relationship with respect to said first mentioned reed means, and test switch means wired in series relation with said additional reed means.

2. In a siren actuated warning device for automobiles, an amplifier, a microphone wired to the input connections of said amplifier, said microphone being enclosed in a sealed housing secured to an exterior surface of the automobile, said amplifier including an oscillating coil output, a reed bank positioned adjacent said oscillating coil output and including a plurality of tuned reeds having resonant frequencies equal to frequencies utilized in automotive sirens, contact means adapted to be closed by movement of said reeds, indicator means, relay means wired in series relationship with respect to the contact means of said reed bank so as to be energized by closing of the contact means, said relay means including normally open contacts wired in series relationship with the indicator means, an additional tuned reed mounted in said reed bank and having a resonant frequency equal to a frequency utilized in automobile horns, test contact means adapted to be closed by movement of said additional reed, said test contact means being wired in parallel relation with respect to the first named contact means, and a normally open test switch wired in series with said test contact means.

References Cited in the file of this patent

UNITED STATES PATENTS

| 1,262,333 | Hall | Apr. 9, 1918 |
| 1,860,285 | Gunn | May 24, 1932 |
| 2,817,074 | Faulkner | Dec. 17, 1957 |
| 2,931,020 | Bender | Mar. 29, 1960 |

FOREIGN PATENTS

| 432,865 | Great Britain | Sept. 5, 1935 |
| 217,172 | Australia | Nov. 7, 1957 |